United States Patent
Kováč

(10) Patent No.: US 11,199,245 B2
(45) Date of Patent: Dec. 14, 2021

(54) SPUR GEAR MECHANISM HAVING A BLOCKING MECHANISM

(71) Applicant: Schaeffler Technologies AG & Co. KG, Herzogenaurach (DE)

(72) Inventor: Roman Kováč, Kysucke Nove Mesto (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/771,237

(22) PCT Filed: Dec. 3, 2018

(86) PCT No.: PCT/DE2018/100982
§ 371 (c)(1),
(2) Date: Jun. 10, 2020

(87) PCT Pub. No.: WO2019/114868
PCT Pub. Date: Jun. 20, 2019

(65) Prior Publication Data
US 2021/0172498 A1    Jun. 10, 2021

(30) Foreign Application Priority Data

Dec. 15, 2017   (DE) ................ 10 2017 130 074.0

(51) Int. Cl.
| | |
|---|---|
| *F16H 1/20* | (2006.01) |
| *B60G 17/005* | (2006.01) |
| *B60G 17/015* | (2006.01) |

(52) U.S. Cl.
CPC ............ *F16H 1/20* (2013.01); *B60G 17/005* (2013.01); *B60G 17/0157* (2013.01); *B60G 2204/4604* (2013.01); *B60G 2500/32* (2013.01)

(58) Field of Classification Search
CPC ..... F16H 1/20; B60G 17/005; B60G 17/0157; B60G 2204/46; B60G 2204/4604; B60G 2500/32
See application file for complete search history.

(56) References Cited

U.S. PATENT DOCUMENTS

2020/0055361 A1*  2/2020  Krehmer ............... B60G 17/02

FOREIGN PATENT DOCUMENTS

| DE | 3642938 A1 | 6/1987 |
|---|---|---|
| DE | 102014209939 A1 | 11/2015 |
| DE | 102017109145 B3 | 5/2018 |
| DE | 102017109147 A1 | 8/2018 |

(Continued)

*Primary Examiner* — Jonathan Ng
*Assistant Examiner* — Scott F. Underwood

(57) ABSTRACT

A spur gear includes an input wheel, an output wheel, and an intermediate wheel, which engages via a gear with a gear on the input wheel and with a gear on the output wheel. A blocking mechanism is provided on the intermediate wheel which, in a first operating state, permits the transmission of torque from the input wheel to the output wheel and, in a second operating state, blocks the transmission of torque from the input wheel to the output wheel. At least one guide track for the blocking mechanism is formed on the intermediate wheel, the guide track having a radially inner guide wall and a radially outer guide wall. A latching position for blocking the blocking mechanism is formed on the radially outer guide wall.

17 Claims, 2 Drawing Sheets

(56) References Cited

FOREIGN PATENT DOCUMENTS

| | | | |
|---|---|---|---|
| DE | 102017118787 A1 | 1/2019 | |
| JP | 01056220 A * | 3/1989 | ......... B60G 21/0556 |
| WO | 9015709 A1 | 12/1990 | |
| WO | WO-2011069565 A1 * | 6/2011 | .............. E05F 15/63 |
| WO | WO-2018036584 A1 * | 3/2018 | ............ B60G 17/005 |
| WO | WO-2018149441 A1 * | 8/2018 | ......... B60G 17/0272 |
| WO | WO-2018196911 A1 * | 11/2018 | ............. B60G 17/02 |
| WO | WO-2019015709 A1 * | 1/2019 | ............. B60G 17/02 |

* cited by examiner

SPUR GEAR MECHANISM HAVING A BLOCKING MECHANISM

CROSS-REFERENCE TO RELATED APPLICATIONS

This application is the U.S. National Phase of PCT Appln. No. PCT/DE2018/100982 filed Dec. 3, 2018, which claims priority to DE 10 2017 130 074.0 filed Dec. 15, 2017, the entire disclosures of which are incorporated by reference herein.

TECHNICAL FIELD

The disclosure relates to a spur gear with a blocking mechanism and a level control for a motor vehicle with such a spur gear.

BACKGROUND

Spur gears usually have two bevel gear wheels that engage with each other, with one of the bevel gear wheels forming an input and the other bevel gear wheel forming an output. In this way it is possible to transmit a torque from one bevel gear wheel to the other bevel gear wheel and, if necessary, to change the speed and torque. For some applications, however, it is advantageous if the torque between the first bevel gear wheel and the second bevel gear wheel is not transmitted permanently, but only for an adjustment from an initial position to an adjustment position and the spur gear is fixed in the adjustment position. To hold the adjustment position, locking elements such as latching contours or locking pins are known which secure the spur gear in a form-fitting manner. For fastening, purely mechanical, electromechanical and electrical fastening elements are known. In addition, the gear can be locked in the adjustment position with a hydraulic or pneumatic control element. One application for such a spur gear with a blocking mechanism is a level control in a motor vehicle. Level controls for motor vehicles are generally known from the prior art. The level control is used to increase the ground clearance on uneven roads or ramps or to lower the vehicle on level roads or to load and unload the vehicle. For this purpose, suspension struts with height adjustment are provided on the motor vehicle, in particular on a rear axle of the motor vehicle, whereby the height adjustment can be carried out by a suitable actuator and the motor vehicle can be held in the corresponding position by a corresponding blocking mechanism.

In addition, spur gears are known where an intermediate wheel is arranged between the first bevel gear wheel and the second bevel gear wheel. Due to an intermediate wheel, the input and output wheel have the same circumferential direction. In addition, an intermediate wheel offers further design possibilities with regard to the transmission ratio and a possible blocking of the spur gear.

From DE 10 2014 209 939 A1 a gear assembly with blocking function is known. The gear assembly consists of an input wheel, which is arranged to rotate about a drive axis and has a drive gear section in the circumferential direction. The input wheel can be brought into engagement with an output wheel which is arranged rotatably about an output axis and has an output gear section in the circumferential direction. In this case, the input and output gears can be brought into engagement with each other by means of a rotary movement, so that the gear assembly is in a drive state. The input wheel has an input blocking portion and the output wheel has an output blocking portion, the input blocking portion and the output blocking portion being engageable with each other by further rotation or turning of the input wheel from the driving state so that the gear assembly is in a locked state.

SUMMARY

An alternative design of a gear assembly with a blocking mechanism has a favorable force/lever ratio, can be implemented in a compact design, and reduces the force on the blocking element in comparison with known blocking mechanisms.

A spur gear has an input wheel, an output wheel and an intermediate wheel, which via one gear engages with a gear on the input wheel and with a gear of the output wheel, wherein on the intermediate wheel a blocking mechanism is provided, which in a first operating state allows torque transmission from the input wheel to the output wheel and in a second operating state blocks torque transmission from the input wheel to the output wheel. At least one guide track for the blocking mechanism is provided on the intermediate wheel. The guide track has a radially inner and a radially outer guide wall, whereby a latching position is formed on the radially outer guide wall to block the blocking mechanism. Whereas the latching position is formed between two guide tracks in the solutions known from the prior art, the proposed design allows the latching position to be shifted further outwards in the radial direction, thus reducing the forces on the blocking mechanism, while requiring the same installation space. The at least one guide track is designed to have a radially inner and a radially outer guide wall, whereby a recess is formed in the radially outer guide wall to form the latching position. As an alternative to reducing the mechanical load on the blocking mechanism, it is possible to design the intermediate wheel with a smaller diameter and thus make the entire spur gear more compact. This extra installation space can also be used in particular to stiffen the support bearing of the input wheel.

A blocking mechanism comprises a blocking lever with a locking pin, the blocking lever being pivotally arranged about an axis of rotation. The guide track is formed as a groove between the guide walls, with the locking pin on the blocking lever aligned essentially perpendicular to the guide track so that the locking pin can slide easily in the guide track. Due to the radially outward offset position, the forces acting on the locking pin can be reduced. The guide track is of helical design with the latching position lying radially outside the guide. When turning in one direction, the latching position is "skipped", whereas when turning in the opposite direction, the locking pin is pushed into the latching position and while lying in the latching position blocks the intermediate wheel and thus the spur gear.

It is preferred if the locking pin engages radially or axially in the guide track and can be locked in the latching position by a frictional torque. The advantage of such a design is that it facilitates engagement in the locked position and the associated locking of the spur gear. This prevents the locking device from being inadvertently opened and the spur gear from being unlocked unintentionally.

In a further improvement, it is provided that the blocking lever can be fixed opposite to a housing of the spur gear. In order to enable a simple and cost-effective implementation of the spur gear, it is desirable that the blocking lever is attached to the housing of the spur gear and can be rotated about a rotation axis. This allows easy rotation of the blocking lever from the open position, in which the output wheel can be driven through the intermediate wheel, and a locked position, in which the intermediate wheel is fixed and does not transmit torque to the output wheel. It is also possible that the housing can move translationally to allow for adjustment movement.

In an embodiment, it is provided that a first and a second guide track are formed on the intermediate wheel, the latching position being formed on the radially outer of the two guide tracks. Two guide tracks enable a particularly functionally reliable design of the spur gear. It is provided that when the circumferential direction of the input wheel is reversed, the system changes from the first guide track to the second guide track.

The locking pin may be guided by the first guide track in a first circumferential direction of the intermediate wheel and by the second guide track in a second circumferential direction of the intermediate wheel. This makes it particularly easy to latch the locking pin in the latching position.

The blocking mechanism may consists of a blocking disk in which the at least one guide track is formed. The guide track can either be formed directly in the intermediate wheel or in a blocking disk which is connected to the intermediate wheel for conjoint rotation. Alternatively, the intermediate wheel and the blocking disk can also be manufactured in one piece or connected to each other by means of a suitable connection method with a frictional, positive or material fit.

The at least one guide track may be formed on a lateral surface of the intermediate wheel or on a blocking disk mounted on the lateral surface. The arrangement of a guide track and a corresponding latching position is particularly easy on the outer surface of the intermediate wheel, as these surfaces are particularly easily accessible and thus the design effort for the blocking mechanism can be kept low.

The input wheel may have a smaller diameter and the output wheel a larger diameter than the intermediate wheel. In this case, twice the speed is transmitted from a rapidly rotating input wheel to a more slowly rotating output wheel and from a low torque on the input shaft with the input wheel to a comparatively high torque on the output wheel. The forces and torques acting on the intermediate wheel can be kept comparatively low, so that the forces acting on the blocking mechanism can also be kept comparatively low. This allows the mechanical load on the locking pin to be adjusted accordingly to avoid overloading the locking pin.

A mounting hole for receiving the blocking disk on the intermediate wheel may be arranged axially offset from a central axis of the intermediate wheel. Through offsetting it is possible that the latching position is no longer between the two guide tracks, but that these guide tracks run on a smaller diameter. Additional installation space is made available through offsetting, which allows a more compact embodiment of the spur gear.

A level control is proposed for the height adjustment of a motor vehicle body of a motor vehicle, whereby the level control can be brought into operative connection with suspension struts of the motor vehicle in order to raise or lower the motor vehicle body. It is provided that the level control system includes the spur gear having the blocking mechanism. To adjust the height of the vehicle body, the spur gear is unlocked and the height level of the vehicle body is adjusted via the output wheel of the spur gear. The spur gear is then moved to the locking position, which holds the vehicle body in the setting position and prevents unwanted movement from the selected setting position.

The various embodiments may be advantageously combined, unless otherwise indicated in the individual case.

BRIEF DESCRIPTION OF THE DRAWINGS

In what follows, the spur gear is explained in more detail by means of a preferred exemplary embodiment and the corresponding drawings. Wherein.

DETAILED DESCRIPTION

Figure 1:
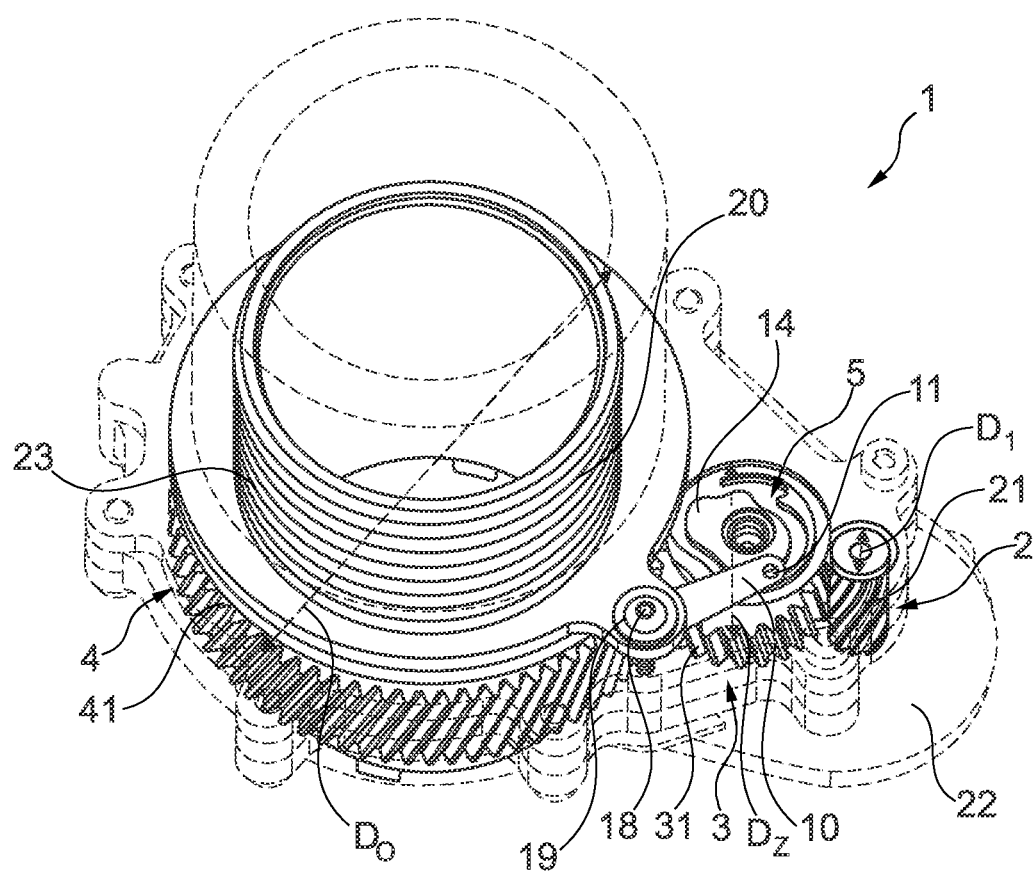
FIG. 1 is an example of a spur gear with a blocking mechanism.

FIG. 1 shows an exemplary embodiment of the design of a spur gear 1. The spur gear 1 comprises an input wheel 2, an intermediate wheel 3 and an output wheel 4. A blocking mechanism 5 is provided on the intermediate wheel 3, with which the spur gear 1 can be locked. Input wheel 2 is driven by a drive shaft not shown. Input wheel 2 has an input gear 21, which engages with gear 31 on the intermediate wheel 3. The gear of the intermediate wheel 31 engages with the gear 41 of the output wheel 4, whereby the input wheel 2 and the output wheel 4 rotate in the same circumferential direction and the intermediate wheel 3 rotates counter to this common circumferential direction of input wheel 2 and output wheel 4. The output wheel 4 is coupled with an adjustment mechanism 20 of a level control of a motor vehicle, which is not shown further and is generally known. The spur gear 1 has a housing 22, in which the input wheel 2, the output wheel 4 and the intermediate wheel 3 are arranged. The gears 21, 31, 41 of the input wheel 2, the intermediate wheel 3 and the output wheel 4 are each engaged on the face side. Input wheel 2 has a diameter $D_I$ which is smaller than the diameter $D_z$ of intermediate wheel 3. The diameter $D_O$ of output wheel 4 is larger than the diameter $D_z$ of intermediate wheel 3. The gears 21, 31, 41 on the input wheel 2, the intermediate wheel 3 and the output wheel 4 are preferably designed as helical gears.

The blocking mechanism 5 comprises a blocking lever 10, which can enter into an operative connection with a blocking disk 14 connected to the intermediate wheel 3 for conjoint rotation. The blocking lever 10 is rotatably mounted on a housing 22 of the spur gear 1 via a receptacle 19. The blocking lever 10 can be pivoted around an axis of rotation 18. A locking pin 11 is formed on the blocking lever 10, and is guided in a guide track 6 on the blocking disk 14.

According to FIG. 1, a spur gear 1 comprises an adjustment mechanism 20 for the height adjustment of a motor vehicle body not shown in the illustration. The output wheel 4 can be designed as a screw nut in order to make a height adjustment of the vehicle body by means of a screw drive 23 when turning. The input wheel 2 can be driven with a drive motor, not shown in the illustration, in particular with an electric motor which is connected to input wheel 2 for conjoint rotation. The housing 22 of the spur gear 1 can be moved translationally, thus enabling a height adjustment of the vehicle body.

Figure 2:
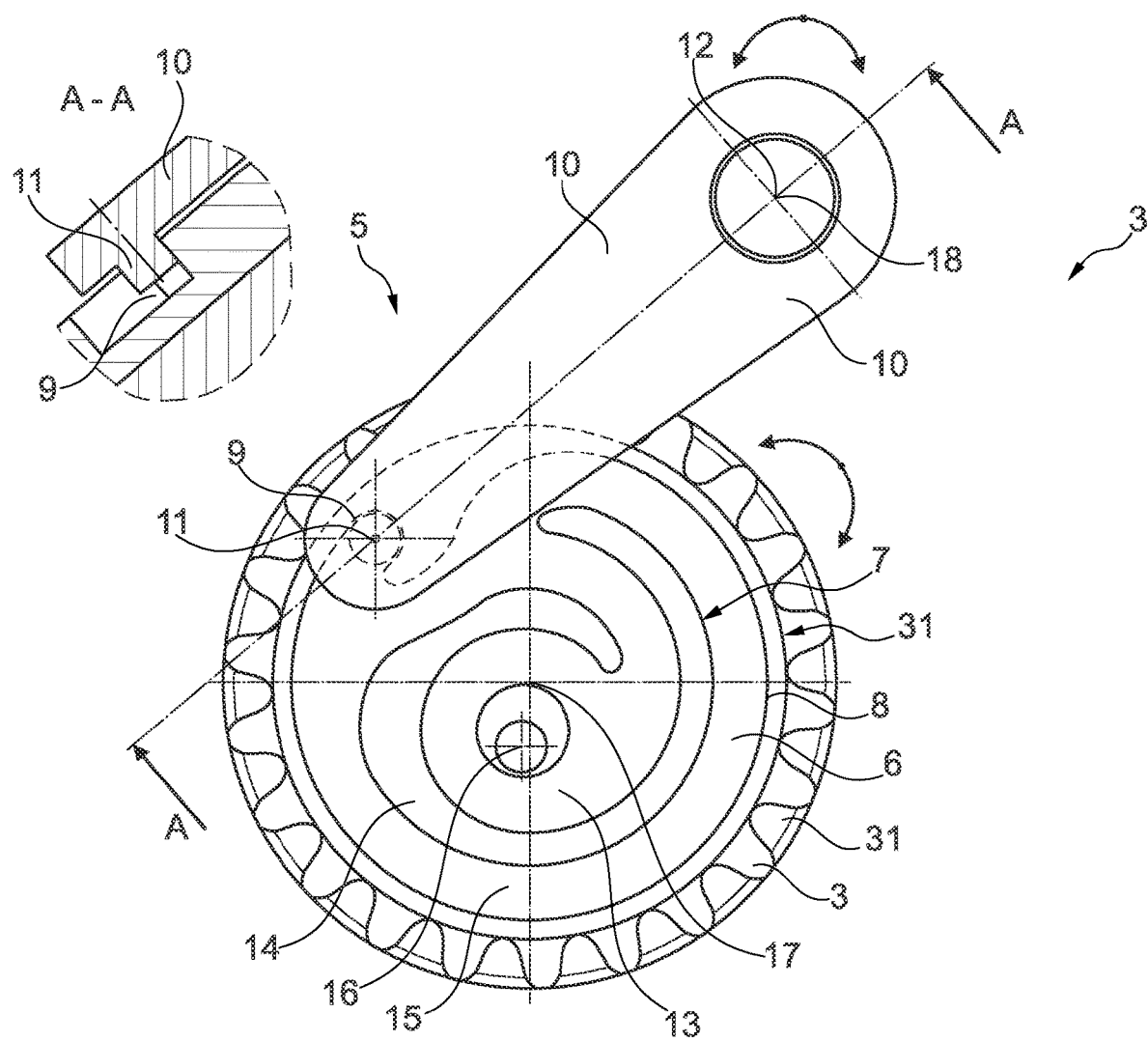
FIG. 2 an intermediate wheel of a spur gear with a corresponding to a blocking lever with locking pin.

FIG. 2 shows a preferred embodiment of a blocking mechanism 5 of the spur gear 1. The blocking mechanism 5 comprises a blocking lever 10 with a locking pin 11 and a blocking disk 14, which is arranged on the intermediate wheel 3. The blocking disk 14 is placed on a lateral surface 15 of the intermediate wheel 3 and is connected thereto for conjoint rotation. In the blocking disk 14, a radially outer first guide track 6 is formed, which is limited by a radially inner guide wall 7 and a radially outer guide wall 8. The locking pin 11 of the blocking lever 10 is guided in this guide track 6. For this purpose, the blocking lever 10 is mounted on its end facing away from the locking pin 11 so that it can be rotated about a rotation axis 12. A pocket-shaped latching position 9 is formed radially on the outside of the guide track 6. A second guide track 13 is formed radially inside the blocking disk 14, which runs in a circle or spiral around a mounting hole 16. A central axis of the second guide track 13 is offset from a central axis 17 of the intermediate wheel 3. In addition, the mounting hole 16 is offset from a center axis 17 of the intermediate wheel 3 and from a center axis of the second guide track 16 to create the necessary space for the second guide track 13.

When the intermediate wheel 3 is turned clockwise as shown in the illustration, the locking pin 11 is guided in the first guide track 6, allowing the intermediate wheel 3 to be turned so that torque is transmitted from the input wheel 2 to the output wheel 4 and the adjustment mechanism 20 can be adjusted accordingly. If the circumferential direction is changed and the intermediate wheel in the illustration is turned anticlockwise, the locking pin 11 of the locking lever 10 is pressed into the latching position 9, making further rotation in this direction impossible and locking the intermediate wheel 3 accordingly.

If adjustment is to be made opposite the first adjustment direction, the locking pin 11 must first be turned out of the latching position and the blocking lever 10 must be turned radially inwards by means of the guide track 6, 13 so that the locking pin 11 dips into the second guide track 13. This allows anticlockwise rotation, so that the adjustment mechanism 20 can be adjusted in the opposite direction.

Alternatively, the guide tracks 6, 13 can also be designed as grooves in the lateral surface 15 of the intermediate wheel 3, so that an additional component in the form of the blocking disk 14 is not required.

The proposed spur gear 1 has a favorable force/lever ratio and is characterized by a compact design and a comparatively low load on the blocking mechanism 5.

LIST OF REFERENCE SYMBOLS

1 Spur gear
2 Input wheel
3 Intermediate wheel
4 Output wheel
5 Locking mechanism
6 Guide track
7 Inner guide wall
8 Outer guide wall
9 Latching position
10 Blocking lever
11 Locking pin
12 Rotation axis
13 Second guide track
14 Blocking disk
15 Lateral surface
16 Mounting hole
17 Central axis
18 Rotation axis of the blocking lever
19 Receptacle
20 Adjustment mechanism
21 Gear on the input wheel
22 Housing
23 Screw drive
31 Gear on the intermediate wheel
41 Output wheel gear $D_I$ Diameter input wheel
$D_O$ Diameter output wheel
$D_Z$ Diameter intermediate wheel

The invention claimed is:

1. A spur gear with an input wheel having a first gear, an output wheel having a second gear, and an intermediate wheel having a third gear which engages the first and second gears, wherein a blocking mechanism is provided on the intermediate wheel, which in a first operating state enables a torque transmission from the input wheel to the output wheel and in a second operating state, blocks the transmission of torque from the input wheel to the output wheel, wherein at least one guide track for the blocking mechanism is formed on the intermediate wheel, the guide track having a radially inner guide wall and a radially outer guide wall, and a latching position for locking the blocking mechanism being formed on the radially outer guide wall.

2. The spur gear according to claim 1, wherein the blocking mechanism comprises a blocking lever with a locking pin, wherein the blocking lever is arranged so as to be pivotable about an axis of rotation.

3. The spur gear according to claim 2, wherein the locking pin engages radially or axially with the guide track and can be locked in the latching position.

4. The spur gear according to claim 2, wherein the blocking lever can be fixed opposite a housing of the spur gear.

5. The spur gear according to claim 1, wherein the at least one guide track includes a radially inner guide track and a radially outer guide track, the latching position being formed on the radially outer guide track.

6. The spur gear according to claim 5, wherein the locking pin is substantially guided by the radially inner guide track in a first circumferential direction of the intermediate wheel and by the radially outer guide track in a second circumferential direction of the intermediate wheel.

7. The spur gear according to claim 1, wherein the blocking mechanism comprises a blocking disk in which the at least one guide track is formed.

8. The spur gear according to claim 7, wherein a mounting hole for receiving the blocking disk on the intermediate wheel is offset from a central axis of the intermediate wheel.

9. The spur gear according to claim 1, wherein the at least one guide track is formed on a lateral surface of the intermediate wheel or a blocking disk mounted on the lateral surface.

10. A level control for adjusting the height of a motor vehicle body of a motor vehicle, wherein the level control can be operatively connected to suspension spring struts of the motor vehicle in order to raise or lower the motor vehicle body, wherein the level control comprises a spur gear with a blocking mechanism according to claim 1.

11. A spur gear comprising:
an input gear wheel;
an output gear wheel;
an intermediate wheel having gear teeth meshing with the input gear wheel and the output gear wheel, a lateral surface of the intermediate wheel having an inner guide wall and an outer guide wall defining an outer guide track therebetween, the outer guide wall further defining a locking position;
and a blocking lever with a locking pin guided by the outer guide track for rotation in a first direction and engageable in the locking position to prevent rotation in a second direction opposite the first direction.

12. The spur gear according to claim 11, wherein the inner guide wall further defines an inner guide track, the guide pin guided by the inner guide track for rotation in the second direction.

13. The spur gear according to claim 12, wherein the intermediate wheel comprises a blocking disk having the inner and outer guide walls and an intermediate gear wheel having the gear teeth.

14. The spur gear according to claim 13, wherein a mounting hole for receiving the blocking disk on the intermediate gear wheel is offset from a central axis of the intermediate wheel.

15. A spur gear comprising:
an input gear wheel;
an output gear wheel;
an intermediate gear wheel meshing with the input gear wheel and the output gear wheel, a lateral surface of the intermediate gear wheel defining an inner guide track and an outer guide track, the outer guide track including a locking position;
and a blocking lever with a locking pin guided by the outer guide track for rotation in a first direction, guided by the inner guide track for rotation in a second direction opposite the first direction, and engageable in the locking position to prevent rotation in the second direction.

16. The spur gear according to claim 15, wherein the intermediate gear wheel has an inner guide wall and an outer guide wall, the outer guide track being radially between the inner guide wall and the outer guide wall, and the inner guide track being radially inward of the inner guide wall.

17. The spur gear according to claim 16, wherein the locking position is defined by the outer guide wall.

* * * * *